United States Patent
Epp

(10) Patent No.: US 11,519,716 B2
(45) Date of Patent: Dec. 6, 2022

(54) APPARATUS, METHOD FOR OPERATING AN APPARATUS HAVING A MOBILE PART MOVABLE ON A MOVEMENT PLANE, AND USE THEREOF

(71) Applicant: SEW-EURODRIVE GMBH & CO. KG, Bruchsal (DE)

(72) Inventor: Mario Epp, Bammental (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 20 days.

(21) Appl. No.: 17/430,571

(22) PCT Filed: Jan. 29, 2020

(86) PCT No.: PCT/EP2020/025037
§ 371 (c)(1),
(2) Date: Aug. 12, 2021

(87) PCT Pub. No.: WO2020/164797
PCT Pub. Date: Aug. 20, 2020

(65) Prior Publication Data
US 2022/0136819 A1    May 5, 2022

(30) Foreign Application Priority Data
Feb. 12, 2019 (DE) .......................... 102019000982.7

(51) Int. Cl.
*G01B 11/02* (2006.01)
*B61B 3/00* (2006.01)
*B61K 1/02* (2006.01)

(52) U.S. Cl.
CPC ............ *G01B 11/026* (2013.01); *B61B 3/00* (2013.01); *B61K 1/02* (2013.01)

(58) Field of Classification Search
CPC ............ G01B 11/026; B61B 3/00; B61K 1/02
See application file for complete search history.

(56) References Cited

U.S. PATENT DOCUMENTS

| | | | | |
|---|---|---|---|---|
| 4,309,109 A | * | 1/1982 | Blodgett | G01B 11/14 356/506 |
| 6,160,664 A | * | 12/2000 | Du | G02B 19/0052 359/619 |
| 8,548,751 B2 | | 10/2013 | Lucks | |
| 9,482,524 B2 | | 11/2016 | Metzler et al. | |
| 2012/0200852 A1 | * | 8/2012 | Tejada | H01L 27/14629 356/326 |

FOREIGN PATENT DOCUMENTS

| | | |
|---|---|---|
| DE | 102009031452 A1 | 1/2011 |
| EP | 2511656 A1 | 10/2012 |
| JP | H04282411 A | 10/1992 |
| JP | 2009214986 A | 9/2009 |
| KR | 1020100085368 A | 7/2010 |
| WO | 2009068437 A1 | 6/2009 |

OTHER PUBLICATIONS

International Search Report issued in corresponding International Application No. PCT/EP2020/025037, dated May 11, 2020, pp. 1-2, English Translation.

* cited by examiner

*Primary Examiner* — Jonathan M Hansen
(74) *Attorney, Agent, or Firm* — Carter, DeLuca & Farrell LLP

(57) ABSTRACT

In an apparatus and method for operating an apparatus having a mobile part which is movable on a movement plane and has a measuring unit, and a measuring body which is set apart from the movement plane and from the plane parallel to the movement plane that includes the measuring unit, for example, and is situated as far as possible from the movement plane, the measuring unit is adapted to determine the distance between the measuring body and the measuring unit in a normal direction to the movement plane, and the measuring body is shaped such that in the projection of the measuring body perpendicular onto the plane, e.g., the projection surface, an individual distance value is bijectively allocated to the, or to the plurality of, partial surface regions of the projection surface, which particularly do not overlap one another.

21 Claims, 4 Drawing Sheets

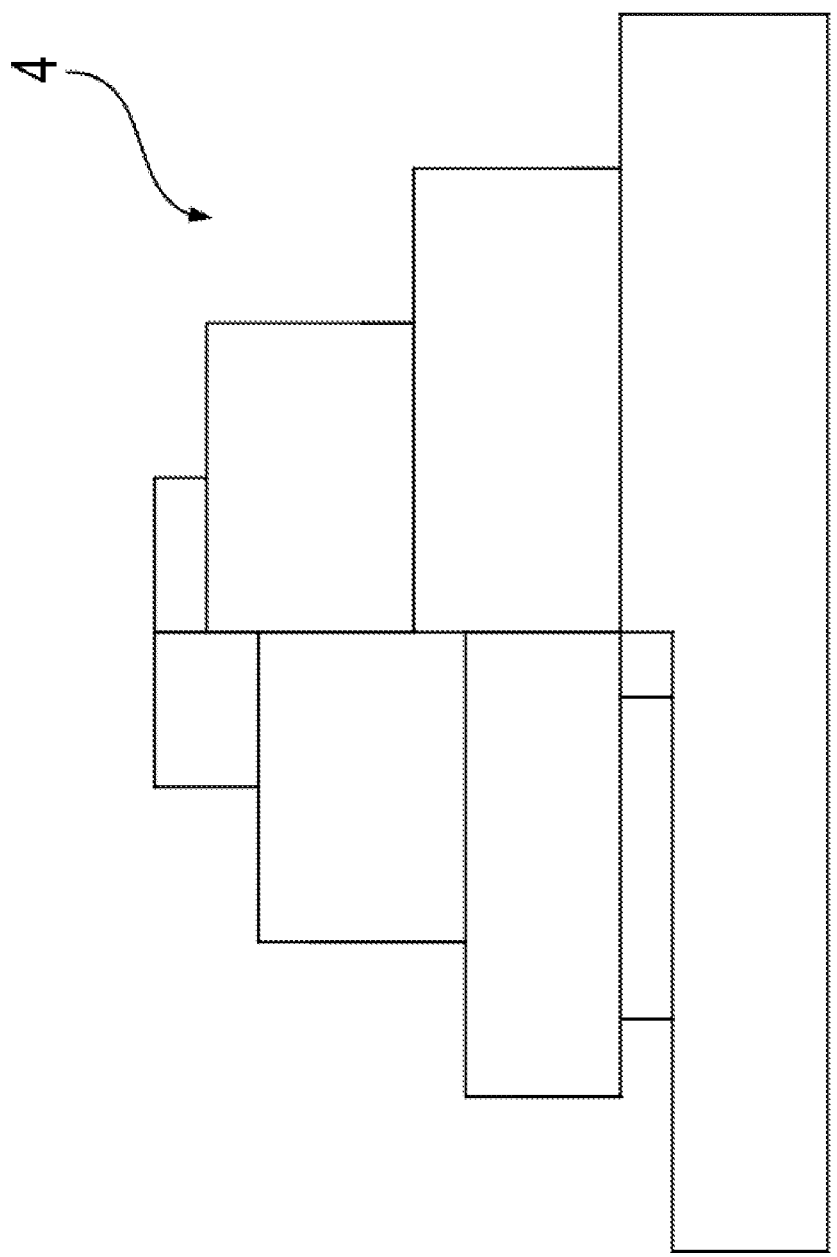

APPARATUS, METHOD FOR OPERATING AN APPARATUS HAVING A MOBILE PART MOVABLE ON A MOVEMENT PLANE, AND USE THEREOF

FIELD OF THE INVENTION

The present invention relates to an apparatus, to a method for operating an apparatus having a mobile part movable on a movement plane, and to a use thereof.

BACKGROUND INFORMATION

In certain conventional systems, a mobile part can be moved on a movement plane.

PCT Patent Document No. WO 2009/068437 describes a method for measuring a deflection of a hollow component of a wind energy system from a normal position.

German Patent Document No. 10 2009 031 452 describes a method for controlling bending of structural members with the aid of a laser.

SUMMARY

Example embodiment of the present invention provide an apparatus that offers greater efficiency.

According to an example embodiment of the present invention, an apparatus includes a mobile part which is movable on a movement plane and has a measuring unit, and a measuring body which is set apart from the movement plane and from the plane parallel to the movement plane that includes the measuring unit, for example, and is situated as far as possible from the movement plane. The measuring unit is adapted to determine the distance between the measuring body and the measuring unit in the normal direction to the movement plane, and the measuring body is shaped such that in the projection of the measuring body perpendicular onto the plane, e.g., the projection surface, an individual distance value is bijectively allocated to the, or to the plurality of, partial surface regions of the projection surface, which particularly do not overlap with one another.

Determining a distance, i.e., a one-dimensional variable, offers the advantage that the deviation from a setpoint position, i.e., a two-dimensional variable, is able to be determined. By measuring the distance, it is therefore known in which direction the setpoint position is reachable, and the drive and the steering of the mobile part are able to be moved in this direction to the setpoint position. This makes it possible to carry out a very rapid control to the setpoint position, the setpoint position being specified on the measuring body. The apparatus can therefore be operated very efficiently. For example, when the target position is reached, a load can be transferred or a load carried by the rail vehicle is able to be processed by a tool that is located on the mobile part or, alternatively, a load carried by the mobile part is able to be processed by a tool located on the rail vehicle.

According to example embodiments, the measuring body is situated on a rail vehicle of the apparatus, which is movable on a rail of the apparatus, the rail vehicle, for example, being a monorail suspension vehicle. This offers the advantage that the mobile part is able to be synchronized with the rail vehicle and a transfer of a load while driving can therefore take place.

According to example embodiments, the measuring unit emits a light beam in parallel with the normal direction to the movement plane and determines the distance between the measuring unit and the measuring body in the normal direction from the light reflected at the measuring body. This has the advantage that the distance is determined along the light beam, which is, for example, arranged as a laser beam and thus makes it possible to determine the distance of a quasi-punctiform surface region of the measuring body.

According to example embodiments, the measuring body is shaped such that the distance increases monotonically, but especially not strictly monotonically, with increasing radial distance to a setpoint position or to a first partial surface region of the projection surface, e.g., the radial direction and the circumferential direction relating to the straight line that passes through the setpoint position or through the first partial surface region and extends in parallel with the normal direction to the movement plane. This offers the advantage that the optimal setpoint position is achievable because of the control to smaller distance values.

According to example embodiments, the distance as a function of the radial distance and the circumferential direction has a local or absolute minimum in the setpoint position or in the first partial surface region. This has the advantage that a particularly uncomplicated control of the mobile part to the minimum is possible.

According to example embodiments, the measuring body is shaped such that the distance in a respective circumferential angle region increases monotonically, but especially not strictly monotonically, according to a respective step function with increasing radial distance to a setpoint position or to a first partial surface region of the projection surface, the radial direction and the circumferential direction, e.g., relating to the straight line that passes through the setpoint position or through the first partial surface region and extends parallel with the normal direction to the moving plane. Determining the distance value between the measuring unit and the measuring body offers the advantage that a unique deviation from a setpoint position is able to be determined, the deviation, e.g., being a planar vector.

According to example embodiments, the step function of a respective circumferential angle region differs from all other step functions of the respective other circumferential angle regions, e.g., all values of the step function of a respective circumferential angle region differing from all values of all other step functions of the respective other circumferential angle regions. This offers the advantage that a circumferential angle value or at least a circumferential angle value range as well as a radial distance value may be uniquely inferred from the distance value determined by the measuring unit, that is to say, a deviation. This deviation thus is able to be conveyed to a controller whose set value can be forwarded to the drive and to the steering unit of the mobile part, the mobile part thereby being controlled to a predefined setpoint position in relation to the rail vehicle.

According to example embodiments, the radial width of the steps of the step functions of all circumferential angle regions is the same. This is considered advantageous insofar as a simple control to a setpoint position that moves along with the rail vehicle is able to be carried out, e.g., given equidistant steps.

According to example embodiments, a light sensor by which the light of an illumination device disposed on the mobile part is detectable is situated on the rail vehicle next to the measuring body in the rail direction. This has the advantage that the rail vehicle is able to monitor whether the mobile part is following or whether it has been lost. No complex data transmission between the mobile part and the rail vehicle must therefore be installed.

According to example embodiments, the illumination device is situated in a tube so that the light emerging from the tube generates an illuminated region, e.g., a light spot, on the rail vehicle. This is considered advantageous insofar as a directed light beam is readily generated. As an alternative, a lens array which images a well-defined region as the illuminated region, e.g., a light spot, on the rail vehicle may also be used.

According to example embodiments, the extension of the light spot is greater in the rail direction than the extension of the measuring body in the rail direction. This is considered advantageous insofar as it allows for monitoring so that it can be ascertained whether the synchronization of the mobile part with the aid of the measuring body is still able to be carried out or whether the mobile part has already moved too far from the measuring body.

According to an example embodiment of the present invention, in a method for operating an apparatus, in a first step, e.g., in the initial operation of the apparatus, a circumferential angle and a radial distance are allocated as deviation values to distance values related to the measuring body in a memory of the mobile part. In a second step, e.g., in the operation of the apparatus following the initial operation, the distance between the measuring unit and the measuring body is determined in a recurrent manner over time, and the deviation values allocated to the determined distance value are read from the memory, and a controller unit determines a set value for the drive of the mobile part such that the deviation values are controlled to a setpoint value. This has the advantage that the mobile part is able to be controlled with the aid of the controller so that it is controllable to a setpoint position that moves along with the rail vehicle. This makes it possible to achieve an adequate synchronization in which the transfer of a load from the mobile part to a moving rail vehicle is able to take place.

According to example embodiments, during the second step, a load carried by the mobile part is transferred to the rail vehicle, or during the second step, a load carried by the rail vehicle is transferred to the mobile part.

This has the advantage that greater efficiency is achievable in many cases because no deceleration is necessary prior to transferring the load, but a transfer of the load can take place while driving.

According to example embodiments, a light sensor, which may be used to detect the light of an illumination device situated on the mobile part, is situated on the rail vehicle next to the measuring body in the rail direction. This is considered advantageous insofar as it can be monitored whether the mobile part is still within the synchronization region or has left this region.

According to example embodiments, the illumination device is situated in a tube so that the light emerging from the tube generates an illuminated region, e.g., a light spot, on the rail vehicle, the extension of the light spot in the rail direction, for example, being greater than the extension of the measuring body in the rail direction. This has the advantage that a light spot can be produced in an especially uncomplicated manner, whose width in the rail direction is slightly broader, e.g., 10 percent broader, than the extension of the measuring body in the rail direction.

Further features and aspects of example embodiments of the present invention are described in greater detail below with reference to the appended schematic Figures.

BRIEF DESCRIPTION OF THE DRAWINGS

FIG. 4 is a schematic side view of measuring body 4 from a second viewing direction perpendicular to the first viewing direction.

DETAILED DESCRIPTION

Figure 1:
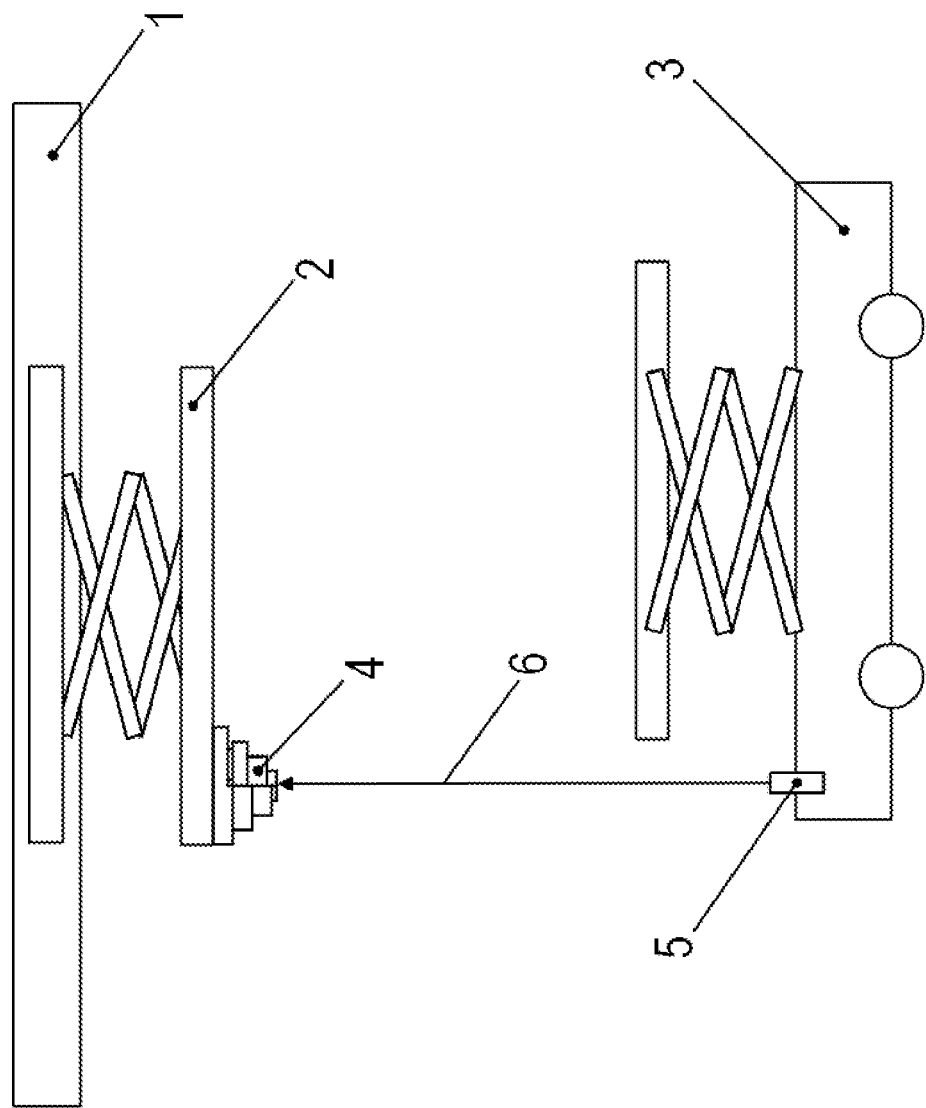
FIG. 1 schematically illustrates an apparatus according to an example embodiment of the present invention, in which a measuring body 4 is situated on a rail vehicle 2.

As schematically illustrated in the Figures, an apparatus according to an example embodiment of the present invention has a rail vehicle 2 which is movable along a rail 1 and to which a measuring body 4 is fastened.

Rail 1 is, for example, disposed above the floor of the apparatus so that measuring body 4 is situated on the underside of rail vehicle 2.

A mobile part 3 movable on the floor of the apparatus is therefore able to drive underneath rail vehicle 2, e.g., measuring body 4.

In order to reach a precise position, mobile part 3 has a measuring unit 5, e.g., a laser distance-measuring device, which emits a light beam 6, e.g., vertically, and determines the distance from measuring body 4 by evaluating the reflected light.

After the target position has been reached, a load is able to be transferred from rail vehicle 2 to mobile part 3.

A transfer while in motion is also possible. This is because the determination of the distance of measuring body 4 also makes it possible to determine the deviation from the setpoint position, i.e., for example, from the synchronization point, and the position of mobile part 3 is able to be controlled to the setpoint position with the aid of a position control.

When the setpoint position has been reached, a previously known distance between measuring unit 5 and measuring body 4 is reached as well. For example, this is the smallest distance between measuring body 4 and measuring unit 5 also for all possible movement positions of the mobile part on the floor of the apparatus.

Measuring body 4 is, for example, shaped such that the distance between measuring body 4 and measuring unit 5 is bijective with surface regions of the plane defined by the possible positions of measuring unit 5. In addition, the distance increases monotonically, but especially not strictly monotonically, as the distance to the setpoint position increases.

Thus, after determining the distance acquired by measuring unit 5 during a measurement in each case, the direction and the distance to the setpoint position are known as well, the accuracy depending on the distance graduation of the surface regions.

To this end, measuring body 4, for example, has a stepped configuration.

Figure 2:
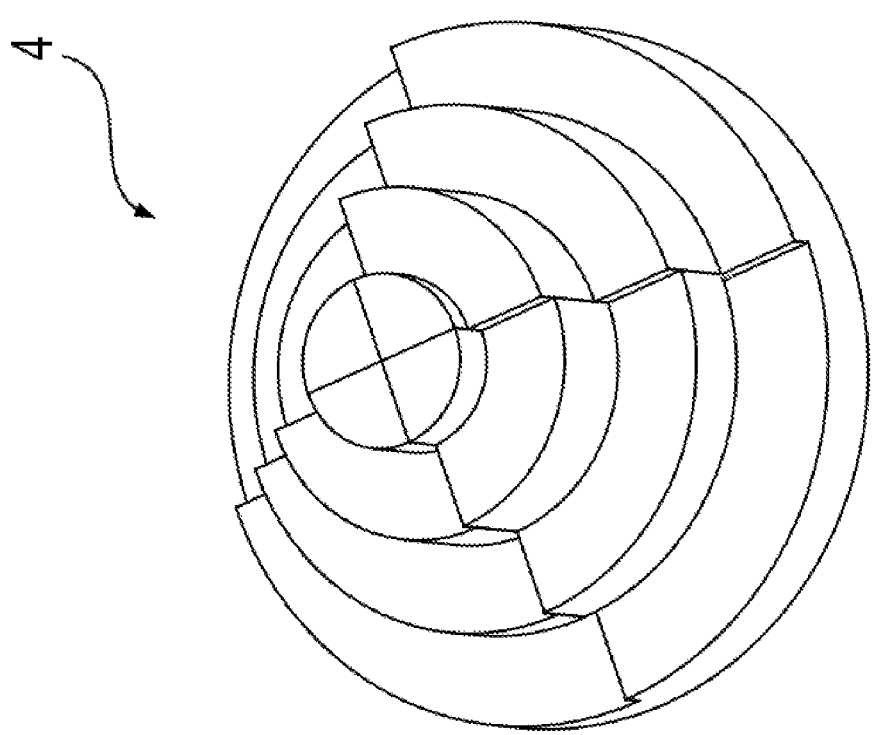
FIG. 2 is a schematic perspective view of measuring body 4.
Figure 3:
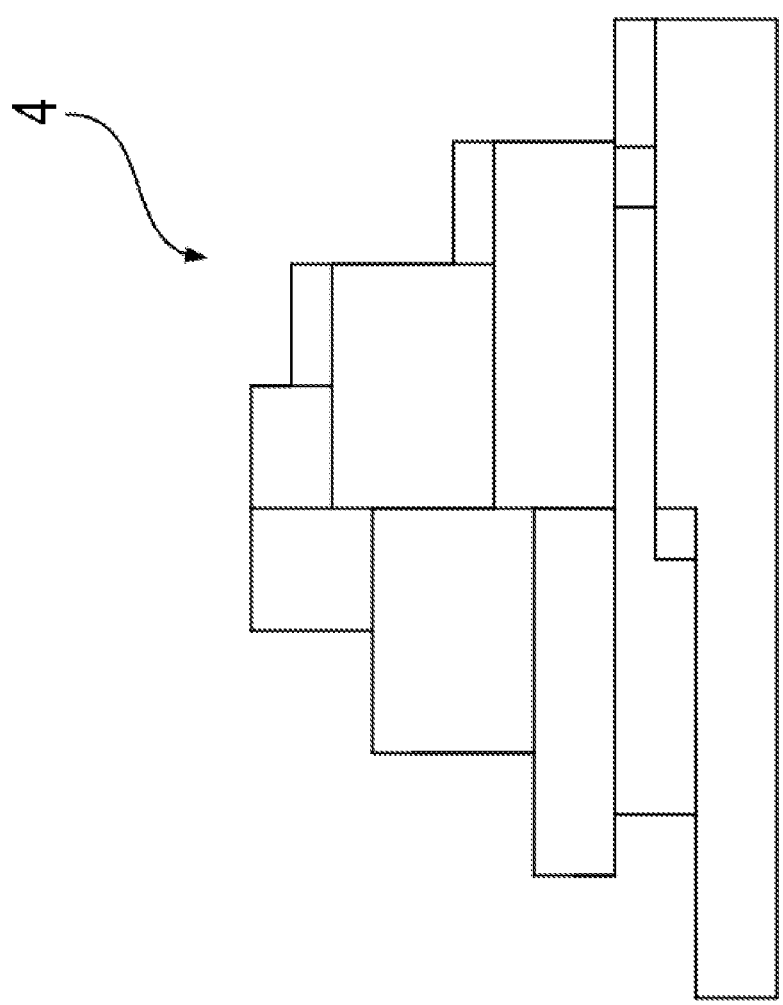
FIG. 3 is a schematic side view of measuring body 4 from a first viewing direction.

As schematically illustrated in greater detail in FIGS. 2, 3 and 4, measuring body 4 has four circumferential angle regions, and the distance to measuring unit 5 increases monotonically, but not strictly monotonically, in each circumferential angle region as the radial distance from a surface region including the setpoint position increases. This is because this distance from measuring unit 5 is a step-shaped function as a function of the radial distance to the setpoint position.

A distance value to measuring unit 5 is bijectively allocated to each plateau of the step function.

The distance value is always the vertical height difference between measuring unit 5 and measuring body 4, e.g., the plateau of measuring body 4.

The radial width of the first step, i.e., the radial step width, viewed from the setpoint position, is identical in each one of the circumferential angle regions. The same holds true for the next step, etc.

As a result, the step-shaped function is the same, and thus identical, in each circumferential angle.

The radial width of each one of the stair steps, i.e., the radial step width, is, for example, the same in each case.

Light beam 6, e.g., a laser beam, of measuring unit 5 always has a vertical orientation so that it is always only a plateau of measuring body 4 that is struck by the laser beam and measured in this manner.

A light sensor by which the light of an illumination device situated on mobile part 3 is detectable is situated on rail vehicle 2 next to measuring body 4 in the rail direction. The illumination device is situated in a tube so that the light emerging from the tube generates a light spot on the rail vehicle. As soon as the light spot no longer includes the light sensor, a stop command is generated for rail vehicle 2.

In this manner, it is monitored whether mobile part 3 follows the rail vehicle in a synchronized manner or whether it has left the region of the synchronization.

The extension of the light spot is greater in the rail direction than the extension of measuring body 4 in the rail direction.

In further exemplary embodiments, another direction is used in place of the vertical direction. However, this direction is, e.g., in parallel with the normal direction of the planar movement plane of mobile part 3.

LIST OF REFERENCE NUMERALS

1 rail
2 rail vehicle
3 mobile part
4 measuring body
5 measuring unit, e.g., laser distance-measuring device
6 light beam

The invention claimed is:

1. An apparatus, comprising:
    a mobile part movable on a movement plane and including a measurement unit; and
    a measurement body set apart from the movement plane and from a plane parallel to the movement plane that includes the measurement unit and arranged as far as possible from the movement plane;
    wherein the measurement unit is adapted to determine a distance between the measurement body and the measurement unit in a direction normal to the movement plane; and
    wherein the measurement body is shaped such that in a projection of the measurement body perpendicular to the plane, a unique distance value is bijectively allocated to each of a plurality of partial surface regions of a projection surface of the measurement body that do not overlap with each other.

2. The apparatus according to claim 1, wherein the measurement body is arranged on a rail vehicle of the apparatus that is movable on a rail of the apparatus.

3. The apparatus according to claim 2, wherein the rail vehicle is arranged as a monorail suspension vehicle.

4. The apparatus according to claim 1, wherein the measurement unit is adapted to emit a light beam in parallel with the normal direction to the movement plane and to determine the distance between the measurement unit and the measurement body in the normal direction from light reflected at the measurement body.

5. The apparatus according to claim 1, wherein the measurement body is shaped such that a distance increases monotonically but not strictly monotonically with increasing radial distance to a setpoint position or to a first partial surface region of the projection surface, a radial direction and a circumferential direction relating to a straight line that passes through the setpoint position or through the first partial surface region and extends parallel with the normal direction to the movement plane.

6. The apparatus according to claim 5, wherein the distance as a function of the radial distance and the circumferential direction has a local or absolute minimum in the setpoint position or in the first partial surface region.

7. The apparatus according to claim 1, the measurement body is shaped such that a distance in a respective circumferential angle region increases monotonically but not strictly monotonically according to a respective step function with increasing radial distance to a setpoint position or to a first partial surface region of the projection surface, a radial direction and a circumferential direction relating to a straight line that passes through the setpoint position or through the first partial surface region and extends in parallel with the normal direction to the moving plane.

8. The apparatus according to claim 7, wherein the step function of a respective circumferential angle region differs from all other step functions of the respective other circumferential angle regions, all values of the step function of a respective circumferential angle region differing from all values of all other step functions of the respective other circumferential angle regions.

9. The apparatus according to claim 7, wherein a radial width of the steps of the step functions of all circumferential angle regions is the same.

10. The apparatus according to claim 2, wherein a light sensor adapted to detect light of an illumination device arranged on the mobile part is arranged on the rail vehicle next to the measurement body in a rail direction.

11. The apparatus according to claim 10, wherein the illumination device is arranged in a tube so that light emerging from the tube generates an illuminated region and/or a light spot on the rail vehicle, an extension of the illuminated region and/or the light spot being greater in the rail direction than an extension of the measurement body in the rail direction.

12. A method for operating the apparatus recited in claim 1, comprising:
    allocating, in a memory of the mobile part, a circumferential angle and a radial distance as deviation values to distance values related to the measurement body;
    determining, in a recurrent manner over time, a distance between the measurement unit and the measurement body;
    reading, from the memory, the deviation values allocated to a determined distance value; and
    determining, by a controller unit, a set value for a drive of the mobile part to control the deviation values to a setpoint value.

13. The method according to claim 12, wherein the allocating is performed in an initial operation of the apparatus and the determining of the distance between the measurement unit and the measurement body, the reading, and the determining of the set value for the drive are performed after the initial operation of the apparatus.

14. The method according to claim 12, further comprising transferring a load carried by the mobile part to a rail vehicle during at least one of the determining of the distance between the measurement unit and the measurement body, the reading, and the determining of the set value for the drive during the second step, a load carried by the mobile part is transferred to the rail vehicle.

15. The method according to claim 12, further comprising transferring a load carried by a rail vehicle to the mobile part during at least one of the determining of the distance between the measurement unit and the measurement body, the reading, and the determining of the set value for the drive during the second step, a load carried by the mobile part is transferred to the rail vehicle.

16. The method according to claim 12, further comprising generating a stop command for a rail vehicle of the apparatus as soon as a light sensor, arranged on the rail vehicle next to the measurement body in a rail direction and adapted to detect light of an illumination device arranged on the mobile part, no longer detects an illuminated region illuminated by the illumination device.

17. The method according to claim 16, further comprising monitoring whether the mobile part follows the rail vehicle in a synchronized manner or whether the mobile part has left a region of synchronization.

18. An apparatus, comprising:
- a rail;
- a rail vehicle movable on the rail and including a light sensor;
- a mobile part movable on a movement plane and including a measurement unit;
- and an illumination device and
- a measurement body set apart from the movement plane and from a plane parallel to the movement plane that includes the measurement unit;
- wherein the measurement unit is adapted to determine a distance between the measurement body and the measurement unit in a direction normal to the movement plane;
- wherein the measurement body is shaped such that in a projection of the measurement body perpendicular to the plane, a distance value is bijectively allocated to each of a plurality of partial surface regions of a projection surface of the measurement body;
- wherein the measurement body is arranged on the rail vehicle; and
- wherein the light sensor is adapted to detect light of the illumination device, the light sensor being arranged on the rail vehicle next to the measurement body in a rail direction.

19. The apparatus according to claim 18, wherein the illumination device is arranged in a tube so that light emerging from the tube generates an illuminated region and/or a light spot on the rail vehicle, an extension of the illuminated region and/or the light spot in the rail direction being greater than an extension of the measurement body in the rail direction.

20. The apparatus according to claim 18, wherein the apparatus is operable using a method that includes:
- allocating, in a memory of the mobile part, a circumferential angle and a radial distance as deviation values to distance values related to the measurement body;
- determining, in a recurrent manner over time, a distance between the measurement unit and the measurement body;
- reading, from the memory, the deviation values allocated to a determined distance value; and
- determining, by a controller unit, a set value for a drive of the mobile part to control the deviation values to a setpoint value.

21. The apparatus according to claim 20, wherein the allocating is performed in an initial operation of the apparatus and the determining of the distance between the measurement unit and the measurement body, the reading, and the determining of the set value for the drive are performed after the initial operation of the apparatus.

* * * * *